United States Patent
Chacko et al.

(10) Patent No.: US 12,354,052 B2
(45) Date of Patent: Jul. 8, 2025

(54) METHOD AND SYSTEM FOR SECURING DELIVERY OF A PACKAGE

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Pawan Jiyalal Yadav, Chennai (IN)

(73) Assignee: HCL Technologies Limited, New Delhi (IN)

( * ) Notice: Subject to any disclaimer, the term of this patent is extended or adjusted under 35 U.S.C. 154(b) by 0 days.

(21) Appl. No.: 18/395,668

(22) Filed: Dec. 25, 2023

(65) Prior Publication Data

US 2024/0211853 A1 Jun. 27, 2024

(30) Foreign Application Priority Data

Dec. 26, 2022 (IN) .............................. 202211075495

(51) Int. Cl.
*G06Q 10/0833* (2023.01)
*H04L 9/40* (2022.01)

(52) U.S. Cl.
CPC ..... *G06Q 10/0833* (2013.01); *H04L 63/0861* (2013.01)

(58) Field of Classification Search
CPC ...................................................... G06Q 10/08
See application file for complete search history.

(56) References Cited

U.S. PATENT DOCUMENTS 10,796,512 B2  10/2020  Shah et al.
2018/0357848 A1*  12/2018  McLellan ............ G06Q 10/083
(Continued)

FOREIGN PATENT DOCUMENTS

CN  105825421 A  *  8/2016
CN  108074064 A  *  5/2018
WO  2001035348 A1  5/2001

OTHER PUBLICATIONS

OWASP; "SAML Security Cheat Sheet"; Jul. 16, 2019; https://web.archive.org/web/20190716105610/https://cheatsheetseries.owasp.org/cheatsheets/SAML_Security_Cheat_Sheet.html (Year: 2019).*
(Continued)

*Primary Examiner* — Rupangini Singh
*Assistant Examiner* — David G. Godbold
(74) *Attorney, Agent, or Firm* — Kendal M. Sheets

(57) ABSTRACT

The disclosure relates to method and system for securing delivery of a package. The method may include receiving, from a token generating server, a security token corresponding to security data associated with the delivery of the package. The token generating server may be configured to generate the security token corresponding to the security data upon receiving the security data from a sender device. A security code representative of the security token may be attached to the package. The method may further include capturing the security code from the package at the time of delivery of the package to a receiver, correlating the security code with the security token, to identify a match between the security code and the security token, and upon successful matching of the security code with the security token, allowing access of the package to the receiver.

12 Claims, 5 Drawing Sheets

(56) References Cited

U.S. PATENT DOCUMENTS

| | | | |
|---|---|---|---|
| 2019/0019144 A1* | 1/2019 | Gillen | H04L 9/3236 |
| 2020/0250908 A1* | 8/2020 | Shah | H04L 9/0897 |
| 2021/0125193 A1* | 4/2021 | Bamadhaj | G06F 21/32 |
| 2021/0192446 A1 | 6/2021 | Bitauld et al. | |
| 2022/0058575 A1* | 2/2022 | Moudy | G07F 9/002 |

OTHER PUBLICATIONS

Alabi, Sunday Adebayo; "Authentication Technology Methods for E-Commerce Applications in Nigeria"; Sep. 2021; https://hdl.handle.net/10779/uos.23487932.v1 (Year: 2021).*

Garg, Deepak; "Demystifying SAS Tokens—Basics"; Mar. 29, 2019; https://web.archive.org/web/20221006011600/https://www.c-sharpcorner.com/article/demystifying-sas-token-basics/ (Year: 2019).*

Araf Karsh Hamid ; Domain Driven Design; Aug. 27, 2020.

\* cited by examiner

METHOD AND SYSTEM FOR SECURING DELIVERY OF A PACKAGE

TECHNICAL FIELD

This disclosure relates generally to securing packages, and more particularly to method and system for securing delivery of package, by using smart-locks.

BACKGROUND

Ensuring security of goods during transit and delivery (for example, packages/parcels being shipped via courier, etc.) is important. The package must be kept secured during transit and delivered without any tampering. To this end, the packages are typically sealed or locked with locks, such as smart-locks. The keys for these smart-locks have to be transmitted from the sender to the receiver. It is important to ensure a secured transmittal of the key from the sender to the receiver, to ensure a safe and tamperproof delivery of the packages.

There is, therefore, a need for solutions for analyzing securing the delivery of the packages by securing the package using smart-locks and transmitting the key to the sender over a secured communication network using minimal network bandwidth. It is further desired to double-protect the package by additionally using biometrics of a delivery person who delivers the package to the sender.

SUMMARY

In an embodiment, a method of securing delivery of a package is disclosed. The method may include receiving, from a token generating server, a security token corresponding to security data associated with the delivery of the package. The token generating server may be configured to generate the security token corresponding to the security data upon receiving the security data from a sender device. A security code representative of the security token may be attached to the package. The method may further include capturing the security code from the package at the time of delivery of the package to a receiver, and correlating the security code with the security token, to identify a match between the security code and the security token. The method may further include, upon successful matching of the security code with the security token, allowing access of the package to the receiver.

In another embodiment, a system for securing delivery of a package is disclosed. The system includes a processor and a memory. The memory stores a plurality of processor-executable instructions, which upon execution, cause the processor to receive, from a token generating server, a security token corresponding to security data associated with the delivery of the package. The token generating server may be configured to generate the security token corresponding to the security data upon receiving the security data from a sender device. A security code representative of the security token may be attached to the package. The plurality of processor-executable instructions, upon execution, may further cause the processor to capture the security code from the package at the time of delivery of the package to a receiver and correlating the security code with the security token, to identify a match between the security code and the security token. The plurality of processor-executable instructions, upon execution, may further cause the processor to, upon successful matching of the security code with the security token, allow access of the package to the receiver.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
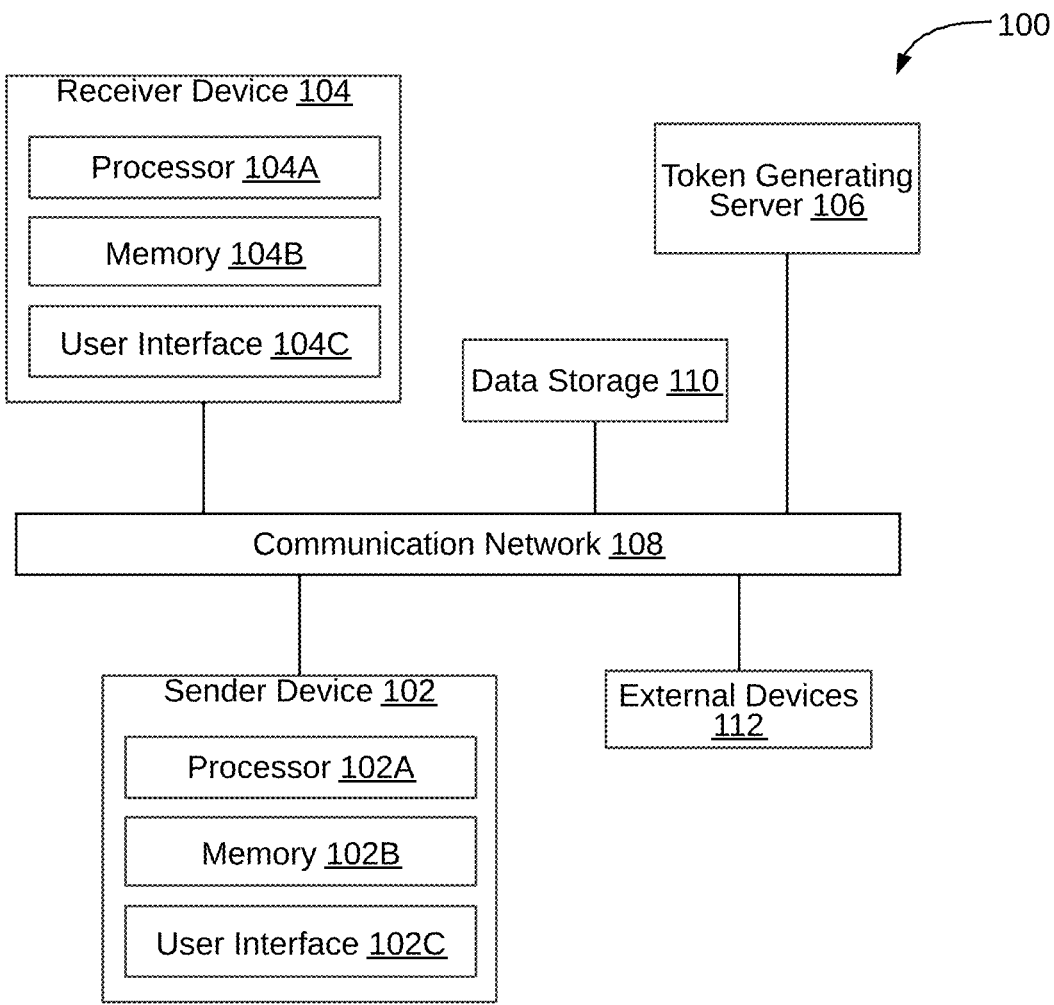
FIG. 1 is a block diagram of an exemplary system for securing delivery of a package, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The present disclosure provides for methods and systems for securing a package, while relying minimally on Internet bandwidth. According to the techniques of the present disclosure, a sender and a receiver share a token via a secured communication channel. The sender (an individual or an authority) sends information including (i) a location (such as From and To address or location), (ii) a relevant time-window in which the package is supposed to be delivered to the receiver, and (iii) user information from a sender device (e.g. a smartphone) to a third party or a certificate authority server, to get the information signed. The third party validates the information and creates a SXML token and sends the same to the receiver device, over a communication network using minimal Internet bandwidth. The package is sealed or locked with the signed information and is optionally embedded with biometric based KDF of a delivery person. This package is then taken up by the delivery person for delivery for delivering to the receiver. The receiver receives the SXML token on the receiver device (e.g. a smartphone). The receiver further proves their identity using a shared access signature (SAS) token. Upon verification, the receiver validates the SXML token and a public key by establishing a communication channel, for example via a near field communication (NFC)-based or a Bluetooth-based communication channel. The reliever then shows the receiver device mobile on the package (i.e. scans a QR code/barcode or performs a digital handshake with the package) and along with the biometrics (optional) of the delivery person, then the package is unlocked.

Therefore, the above techniques provide for enhanced double-way unlocking procedures where the delivery person also must show the token to unlock along with the receiver. Further, when there is any tampering with the package or the delivery location is not the same as desired or if the delivery is not in the valid time-window, then the sender and the receiver are informed accordingly.

The above techniques may not be limited only to physical product packages but may extend to services, such as car rental services, driver-fleet management services, etc. In such services, the techniques can be implemented via softkeys. Similarly, the techniques can find implementation in providing restricted access to public transportation such as train, bus, etc. in which a user is able to open the door (of the train/bus) only in a specified time-window and at a specified location. As such, above techniques can be relevant in various different application areas where there is a need for offline access and locking restrictions.

Referring now to FIG. 1, a block diagram of an exemplary system 100 for securing delivery of a package is illustrated, in accordance with some embodiments of the present disclosure. The system 100 may implement a sender device 102 and a receiver device 104. Further, the system 100 may include a token generating server 106. The system 100 may further include a data storage 110. The sender device 102 may be a computing device having data processing capability. Similarly, the sender device 102 may be a computing device having data processing capability. Examples of the sender device 102 and the receiver device 104 may include, but are not limited to a desktop, a laptop, a notebook, a netbook, a tablet, a smartphone, a mobile phone, an application server, a web server, or the like. The token generating server 106, for example, may be associated with a certificate authority or any other third-party having capabilities of validating and signing information.

Additionally, the sender device 102 and the receiver device 104 may be communicatively coupled to an external device 112 for sending and receiving various data. Examples of the external device 112 may include, but are not limited to, a remote server, digital devices, and a computer system. The sender device 102 and the receiver device 104 may connect to the external device 112 over a communication network 108. The sender device 102 and the receiver device 104 may connect to external device 112 via a wired connection, for example via Universal Serial Bus (USB). A computing device, a smartphone, a mobile device, a laptop, a smartwatch, a personal digital assistant (PDA), an e-reader, and a tablet are all examples of external devices 112.

The receiver device 104 may be configured to perform one or more functionalities that may include receiving, from the token generating server 106, a security token corresponding to security data associated with the delivery of a package. The token generating server 106 may be configured to generate the security token corresponding to the security data upon receiving the security data from the sender device 102. A security code representative of the security token may be attached to the package. The receiver device 104 may further capture the security code from the package at the time of delivery of the package to a receiver, and correlate the security code with the security token, to identify a match between the security code and the security token. Upon successful matching of the security code with the security token, the receiver device 104 may further perform one or more steps to allow access of the package to the receiver.

To perform the above functionalities, the receiver device 104 may include a processor 104A and a memory 104B. The memory 104B may be communicatively coupled to the processor 104A, and stores a plurality of instructions, which upon execution by the processor 104A, cause the processor to perform the above functionalities. Similarly, the sender device 102 may include a processor 102A and a memory 102B. The sender device 102 and the receiver device 104 may further implement a user interface 102C, 104C that may further implement a display. Examples may include, but are not limited to a display, keypad, microphone, audio speakers, vibrating motor, LED lights, etc. The user interface 102C, 104C may receive input from a user and also display an output of the computation performed by the respective sender device 102 and the receiver device 104.

Figure 2:
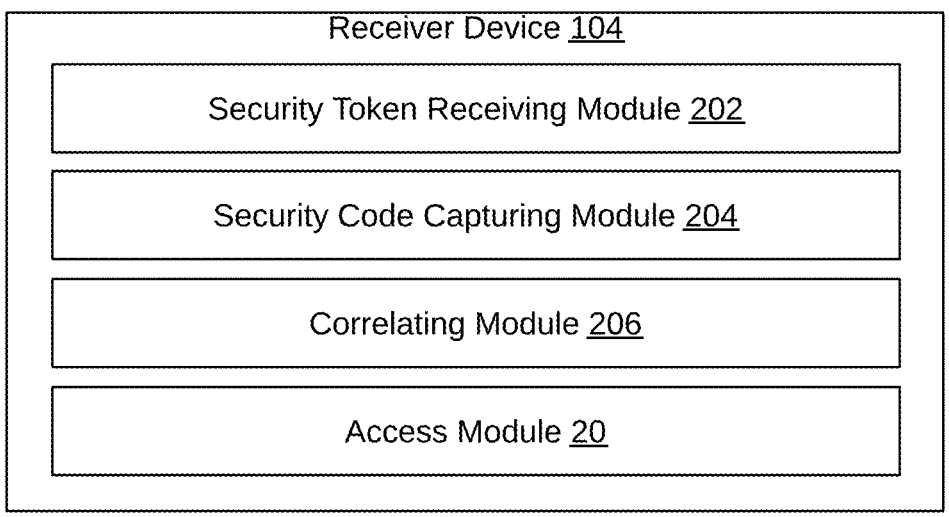
FIG. 2 illustrates a block diagram of a receiver device of the system for securing delivery of a package of FIG. 1 and showing one or more modules, in accordance with some embodiments.

Referring now to FIG. 2, a block diagram of the receiver device 104 showing one or more modules is illustrated, in accordance with some embodiments. In some embodiments, the receiver device 104 may include a security token receiving module 202, a security code capturing module 204, a correlating module 206, and an access module 208.

The security token receiving module 202 may receive, from the token generating server 106, a security token corresponding to security data associated with the delivery of the package. The token generating server 106 may be configured to generate the security token corresponding to the security data upon receiving the security data from a sender device 102. Further, a security code representative of the security token may be attached to the package.

In some embodiments, the security data may include at least one of a receiver location and a delivery time-window. Additionally, in some embodiments, the security data may further include biometrics data of a delivery person. For example, the security token may be a SXML-based token. In some embodiments, the security code representative of the security token may be attached to the package via a security code-bearing image disposed on an outer surface of the package. For example, the security code-bearing image may include a QR code image or a bar code image. Further, in some alternate embodiments, the security code representative of the security token may be attached to the package via a softkey stored in a smart-lock, the smart-lock securing the package.

The security code capturing module 204 may be configured to capture the security code from the package at the time of delivery of the package to the receiver. In some embodiments, the receiver device 104 may capture the security code from the package via a camera, by scanning the security code-bearing image (i.e. the QR code image or the bar code image). In the embodiments, the receiver device 104 may capture the security code (i.e. a softkey stored in the smart-lock) from the package, by establishing a communication channel with the smart-lock securing on the package. For example, the communication channel may be a Bluetooth-based communication channel or a Near Field Communication (NFC)-based communication channel.

The correlating module 206 may correlate the security code with the security token, to identify a match between the security code and the security token. The access module 208 may, upon successful matching of the security code with the security token, allow access of the package to the receiver.

In order to allow access, additionally, an identity of the receiver and at least one of: a location of the delivery associated with the receiver and a time of the delivery of the package to the receiver may be validated. For example, the validation may be performed using a SAS token, via a SAS metadata server. The location of the delivery associated with the receiver and the time of the delivery of the package to the receiver may be validated with respect to the receiver location and the delivery time-window associated with the security data, respectively.

Further, in order to allow access, a communication channel may be established between the smart-lock attached to the package and the receiver device 104. At the time of delivering the package to the receiver, the smart-lock may be configured in a closed condition to secure the package. Upon successful matching of the security code with the security token and validating of the identity of the recipient and at least one of the location of the delivery associated with the recipient and the time of the delivery of the package to the recipient, a digital handshake may be performed between the receiver device 104 and the smart-lock via the communication channel, to configure the smart-lock in an open condition, to thereby allow access to the package.

In some embodiments, the package may be additionally secured using the biometrics of the delivery person. In such embodiments, the security data may further include the biometrics data of the delivery person that may be fetched from a database upon assigning of the delivery person. As such, in order to allow access to the package, at the time of delivery of the package to the receiver, the biometrics of the delivery person may be obtained, for example, via the receiver device 104. The biometrics may be correlated with the biometrics data of the delivery person to identify a match therebetween. Upon successful matching of the biometrics with the biometrics data and the security code with the security token, access of the package may be allowed for the receiver.

Figure 3:
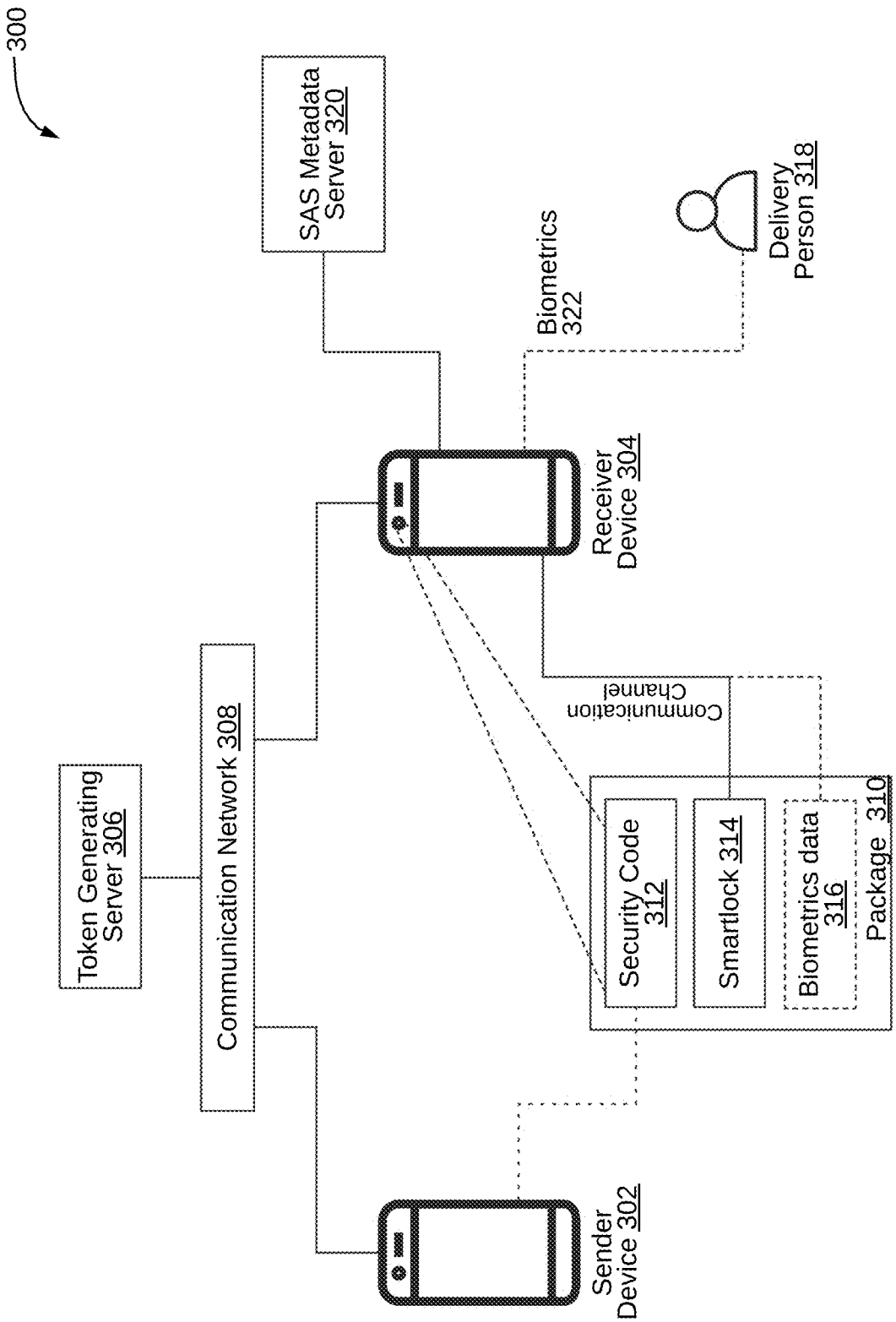
FIG. 3 is a block diagram of an exemplary system for securing delivery of a package, in accordance with another embodiment of the present disclosure.

Referring now to FIG. 3, a block diagram of an exemplary system 300 for securing delivery of a package (corresponding to the system 100) is illustrated, in accordance with some embodiments of the present disclosure. The system 300 may include a sender device 302, a receiver device 304, and a token generating server 306. The sender device 302 and the receiver device 304 may be communicatively coupled with the token generating server 306 over a communication network 308. The communication network 308, for example, may be Internet-based communication network 308.

In one embodiment, a sender may send security data from the sender device 302 to the token generating server 306. By way of an example, the security data may include at least one of: a receiver location and a delivery time-window. The security data may further include sender details and receiver details, for example, name and identity of the sender and the receiver, respectively. Additionally, in some embodiments, the security data may include biometrics data of a delivery person 318.

The token generating server 306 may generate a security token corresponding to the security data upon receiving the security data from the sender device 302. For example, the security token may be a SXML-based token. Further, a security code 312 representative of the security token may be created and attached to a package 310 which is to be delivered to the receiver. The security code 312 representative of the security token may be attached to the package 310 via a security code-bearing image disposed on an outer surface of the package 310. For example, the security code-bearing image may include a QR code image or a bar code image. In other words, the package 310 may be sealed with the QR code image or the bar code image, i.e. the package 310 may be wrapped and sealed with a cover bearing the QR code image or the bar code image. Further, the package may be secured using a smart-lock 314 operable by a softkey.

Once the token generating server 306 generates the security token corresponding to the security data upon receiving the security data from a sender device, the token generating server 306 may send the security token (e.g. the SXML-based token) to the receiver device 304. It should be noted that the token generating server 306 may send the security token to the receiver device 304 over the communication network 308 using minimal Internet bandwidth.

The receiver, at the time of receiving the delivery of the package, may validate at least one of an identity of the receiver, a location of the delivery associated with the receiver, and a time of the delivery of the package 310. For example, the above validation may be performed using a SAS (Shared Access Signature) token, via a SAS metadata server 320. To this end, the receiver device 304 may include a suitable application installed thereon for performing the validation via the SAS token. As will be understood, the location of the delivery associated with the receiver or the time of the delivery of the package to the receiver may be validated with respect to the receiver location and the delivery time-window associated with the security data.

Once the package is received by the receiver, the receiver may capture the security code 312 from the package 310 at the time of delivery of the package, for example, using a camera of the receiver device 304. As such, the receiver may scan the QR code image or the bar code image disposed on the outer surface of the package 310, for example, using the camera of the receiver device 304. The receiver device 304 may have an application installed thereon to allow capturing of the security code 312 and perform further processing steps.

The receiver device 304 may correlate the (captured) security code 312 with the security token (the SXML-based token received from the token generating server 306), to identify a match between the security code and 312 the security token. Upon successful matching of the security code 312 with the security token, the receiver may be allowed access to the package 310.

In some embodiments, in order to allow access to the package 310, a communication channel may be established between the smart-lock 314 securing the package 310 and the receiver device 304. For example, the communication channel may be a Bluetooth-based communication channel or a Near Field Communication (NFC)-based communication channel. To this end, the smart-lock 314 may include a communication module supporting the Bluetooth-based communication or the Near Field Communication (NFC)-based communication. The receiver may further provide a public key.

It should be noted that at the time of delivering the package 310 to the receiver, the smart-lock 314 may be configured in a closed condition to secure the package 310. Upon successful matching of the security code 312 with the security token and validating of the identity of the receiver and the location of the delivery associated with the receiver or the time of the delivery of the package to the receiver, a digital handshake may be attempted between the receiver device 304 and the smart-lock 314 via the communication channel. As such, the smart-lock 314 may be configured in the open condition when the following conditions are met: (i) matching of the security code 312 with the security token, (ii) validation of the identity of the receiver, (iii) validation of the location of the delivery associated with the receiver, and/or (iv) validation of the time of the delivery of the package to the receiver. Additionally, a validation of the public key of the receiver may be required.

In other words, the smart-lock 314 is configured in the open condition from the closed condition when: the security code 312 is matched with the security token (i.e. the SXML-based token), the receiver is identified to as the intended receiver, the location of the delivery matches with the location where the delivery was intended, and/or the time of delivery is within an intended delivery time-window.

In some embodiments, the delivery package 310 may be further secured by adding biometric data 316 of the delivery person. As will be understood, the delivery person may be a person who may deliver the package 310 to the receiver. For example, when the package is to be shipped/sent to the receiver, the delivery person may be assigned for the said delivery. The delivery person may be selected from a pool of delivery persons, and the biometrics data 316 of the delivery person may be fetched from a database upon assigning of the delivery person.

In some embodiments, the biometrics data 316 of the delivery person may be combined with the security data, i.e. the receiver location and the delivery time-window. As such, the security code 312 (the barcode or the QR code) provided on the package 310 may be representative of the security token corresponding to the security data, and this security data may include the receiver identity, biometrics data 316 of the delivery person, and at least one of the receiver location and the delivery time-window.

Alternately, in some embodiments, the biometrics data 316 of the delivery person may be stored in the smart-lock 314, as biometrics-based key derivative function (KDF). Therefore, the security code 312 (the barcode or the QR code) provided on the package 310 may be representative of the security data that may include only the receiver identity, and at least one of the receiver location and the delivery time-window, while the biometric data 316 is stored separately on the smart-lock 314.

At the time of receiving the package by the receiver, in order to allow access of the package 310 to the receiver, biometrics 322 of the delivery person may be obtained via the receiver device 304. For example, a built-in biometrics sensor (e.g. a fingerprint sensor) of the receiver device 304 and a pre-installed application may be used to obtain the biometrics 322 of the delivery person. As will be understood, a fingerprint of the delivery person can be obtained by requesting the delivery person to press a finger on a fingerprint sensor of the receiver device 304. Similarly, the biometrics 322 may include a retina scan that can be obtained by scanning the eyes of the delivery person using the camera of the receiver device 304.

Once the biometrics 322 of the delivery person are obtained, these biometrics 322 may be correlated with the biometrics data 316 of the delivery person corresponding to the security code 312.

In particular, in some embodiments, the biometrics 322 may be combined with the security token (received by the receiver device 304 from the token generating server 306), and the validated information of the identity of the receiver and at least one of: the location of the delivery associated with the receiver and the time of the delivery of the package 310 to the receiver. Thereafter, based on the combined data (i.e. the biometrics 322 combined with the security token and the validated information of the identity of the receiver and at least one of: the location of the delivery associated with the receiver and the time of the delivery of the package 310 to the receiver), a softkey may be generated using which a digital handshake may be attempted between the receiver device 304 and the smart-lock 314 via the communication channel. If the digital handshake is successful, the smart-lock 314 may be configured in the open condition, to thereby allow access to the package 310.

Alternately, the biometrics 322 may be correlated with the biometrics data 316 (i.e. biometrics-based KDF) of the delivery person stored in smart-lock 314, to identify a match therebetween. Alongside, the security code 312 may be correlated with the security token (for example, via a softkey). Upon a successful matching of the biometrics 322 with the biometrics data 316, and of the security code 312 with the security token, access of the package 310 may be allowed to the receiver.

Further, in case there is a mismatch between the security code 312 and the security token or the biometrics 322 with the biometrics data 316 of the delivery person, a notification may be generated and sent to the sender device 302 and optionally to the receiver device 304, so as to alert them about a possible tampering with the package 310 or receiving of the package 310 by a receiver other than the intended receiver.

Figure 4:
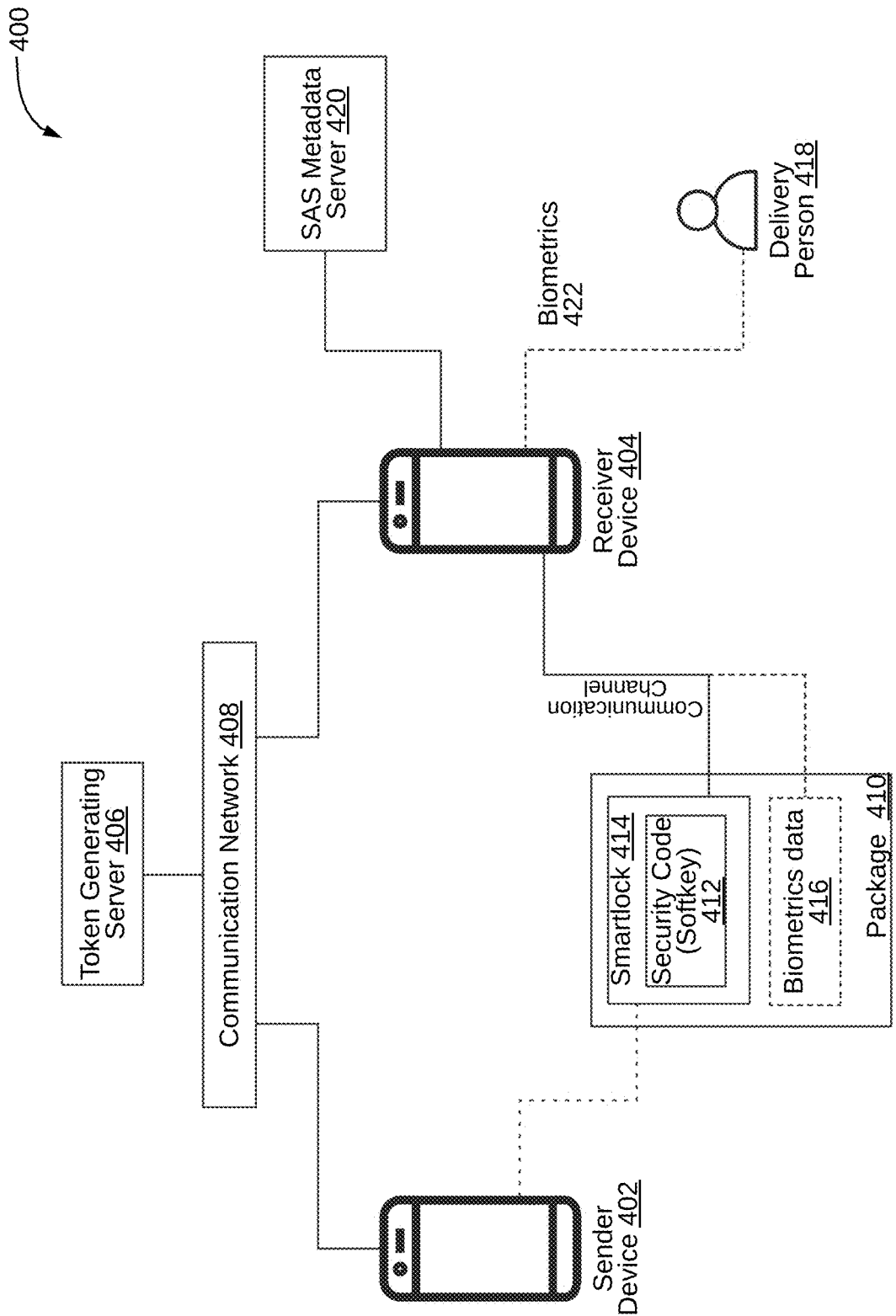
FIG. 4 is a block diagram of an exemplary system for securing delivery of a package, in accordance with yet another embodiment of the present disclosure.

Referring now to FIG. 4, a block diagram of an exemplary system 400 for securing delivery of a package, corresponding to the system 100, is illustrated, in accordance with some embodiments of the present disclosure. The system 400 may include a sender device 402, a receiver device 404, and a token generating server 406. The sender device 402 and the receiver device 404 may be communicatively coupled with the token generating server 406 over a communication network 408. The communication network 408, for example, may be Internet-based communication network 408.

In one embodiment, a sender may send security data from the sender device 402 to the token generating server 406. The security data may include at least one of: a receiver identity, a receiver location, and a delivery time-window. Additionally, the security data may further include sender details and receiver details, for example, name and identity of the sender and the receiver, respectively. Additionally, in some embodiments, the security data may include biometrics data of a delivery person 418.

The token generating server 406 may generate a security token corresponding to the security data upon receiving the security data from the sender device 402. For example, the security token may be a SXML-based token. Further, a security code 412 representative of the security token may be created and attached to a package 410 which is to be delivered to the receiver. The security code representative of the security token may be attached to the package 410 via a softkey 412. This softkey 412 may be stored in a smart-lock 414 securing the package. In other words, the package 410 which is secured by the smart-lock 414 may receive the softkey 412 representative of the security code.

Once the token generating server 406 generates the security token, the token generating server 406 may send the security token (e.g. the SXML-based token) to the receiver device 404, over the communication network 408 using minimal Internet bandwidth.

The receiver, at the time of receiving the delivery of the package 410, may validate at least one of an identity of the receiver, a location of the delivery associated with the receiver, and a time of the delivery of the package 410. For example, the above validation may be performed using a SAS (Shared Access Signature) token, via a SAS metadata server 420. As will be understood, the location of the delivery associated with the receiver or the time of the delivery of the package to the receiver may be validated with respect to the receiver location and the delivery time-window associated with the security data.

Once the package is received by the receiver, the receiver device 404 may capture the security code from the package 410 at the time of delivery of the package 410. In some embodiments, a communication channel may be established between the smart-lock 414 securing the package 410 and the receiver device 404. For example, the communication channel may be a Bluetooth-based communication channel or a Near Field Communication (NFC)-based communication channel. To this end, the smart-lock 414 may include a communication module supporting the Bluetooth-based communication or the Near Field Communication (NFC)-based communication. The receiver device 404 may, therefore, capture the security code (i.e. the softkey 412) from the smart-lock 414 of the package 410, via the communication channel.

The receiver device 404 may then correlate the security code (softkey 412) with the security token (the SXML-based token received from the token generating server 406), to identify a match between the security code and the security token. Upon successful matching of the security code with the security token, the receiver may be allowed access to the package 410.

At the time of delivering the package 410 to the receiver, the smart-lock 414 may be configured in a closed condition to secure the package 410. Upon successful matching of the security code with the security token and validating of the identity of the receiver and the location of the delivery associated with the receiver or the time of the delivery of the package to the receiver, a digital handshake may be attempted between the receiver device 404 and the smart-lock 414 via the communication channel. As such, the smart-lock 414 may be configured in the open condition when the following conditions are met: (i) matching of the security code with the security token, (ii) validating of the identity of the receiver, (iii) the location of the delivery associated with the receiver, and/or (iv) the time of the delivery of the package to the receiver.

In some embodiments, the delivery package 410 may be further secured by adding biometric data 416 of the delivery person 418. For example, when the package 410 is to be shipped/sent to the receiver, the delivery person 418 may be assigned for the said delivery. The delivery person may be selected from a pool of delivery persons, and their biometrics data 416 may be fetched from a database.

In some embodiments, the biometrics data 416 of the delivery person may be combined with the security data, i.e. the receiver location and the delivery time-window. As such, the softkey 412 stored in the smart-lock 414 may be representative of the security token corresponding to the security data, and this security data may include the receiver identity, biometrics data 416 of the delivery person, and at least one of the receiver location and the delivery time-window.

At the time of receiving the package 410 by the receiver, in order to allow access of the package 410 to the receiver, biometrics 422 of the delivery person may be obtained via the receiver device 404. For example, a built-in biometrics sensor (e.g. a fingerprint sensor) of the receiver device 404 and a pre-installed application may be used to obtain the biometrics 422 of the delivery person. As will be understood, a fingerprint of the delivery person can be obtained by requesting the delivery person to press a finger on a fingerprint sensor of the receiver device 404, and a retina scan that can be obtained by scanning the eyes of the delivery person using the camera of the receiver device 404.

Once the biometrics 422 of the delivery person are obtained, these biometrics 422 may be correlated with the biometrics data 416 of the delivery person corresponding to the security code.

In particular, in some embodiments, the biometrics 422 may be combined with the security token (received by the receiver device 404 from the token generating server 406), and the validated information of the identity of the receiver and at least one of: the location of the delivery associated with the receiver and the time of the delivery of the package 410 to the receiver. Thereafter, based on the combined data (i.e. the biometrics 422 combined with the security token and the validated information of the identity of the receiver and at least one of: the location of the delivery associated with the receiver and the time of the delivery of the package 410 to the receiver), another softkey (distinct from the softkey 412) may be generated based on which a digital handshake may be attempted between the receiver device 404 and the smart-lock 414 via the communication channel. If the digital handshake is successful, the smart-lock 414 may be configured in the open condition, to thereby allow access to the package 410.

Alternately, the biometrics 422 may be correlated with the biometrics data 416 (i.e. biometrics-based KDF) of the delivery person stored in the smart-lock 414, to identify a match therebetween. Alongside, the security code may be correlated with the security token (for example, via an associated softkey). Upon a successful matching of the biometrics 422 with the biometrics data 416, and of the security code with the security token, access of the package 410 may be allowed to the receiver.

In case there is a mismatch between the security code and the security token or the biometrics 422 with the biometrics data 416 of the delivery person, a notification may be generated and sent to the sender device 402 and optionally to the receiver device 404, so as to alert them about a possible tampering with the package 410 or receiving of the package by 404 by a receiver other than the intended receiver.

For example, the exemplary systems 300, 400 may be implemented for securing delivery of a courier or parcel, i.e. delivery goods from one location to another. Such goods and the delivery thereof can be secured through the smart-lock, in accordance with the techniques described above. Similarly, the exemplary systems 300, 400 may be implemented in services like car rental/fleet management services. By way of an example, when a car is rented to a receiver by a sender, the delivery of the car keys from the sender to the receiver can be secured through the smart-lock, in accordance with the above techniques. The delivery can be further secured through the biometrics information of the delivery person who is entrusted with delivering the car keys from the sender to the receiver.

Figure 5:
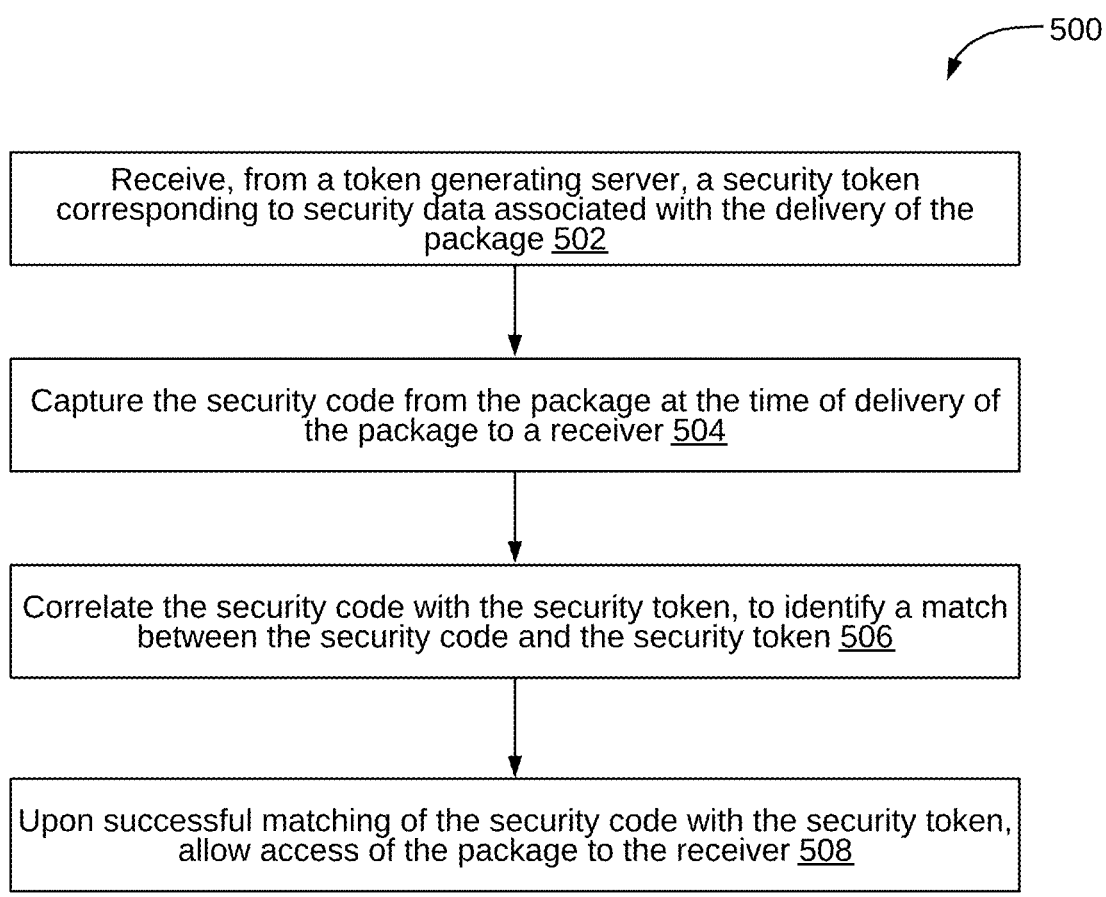
FIG. 5 is a flowchart of a method of securing delivery of a package, in accordance with an embodiment of the present disclosure.

Referring now to FIG. 5, a flowchart of a method 500 of securing delivery of a package is illustrated, in accordance with some embodiments. The method 500 may be performed by the system 100, 300, 400, as explained in conjunction with FIGS. 1, 3, 4, respectively in the previous sections of this disclosure. The method 500 is explained below in conjunction with FIG. 1.

At step 502, the receiver device 104 may receive a security token corresponding to security data associated with the delivery of the package, from the token generating server 106. As mentioned above, the sender device 102 and the receiver device 104 may be computing devices, for example, smartphones associated with a sender and a receiver, respectively. The token generating server 106 may be configured to generate the security token corresponding to the security data upon receiving the security data from the sender device 102. Further, a security code representative of the security token may be attached to the package.

In some embodiments, the security data may include at least one of a receiver location and a delivery time-window. Additionally, in some embodiments, the security data may further include biometrics data of a delivery person. For example, the security token may be a SXML-based token. In some embodiments, as explained via FIG. 3, the security code representative of the security token may be attached to the package via a security code-bearing image disposed on an outer surface of the package. For example, the security code-bearing image may include a QR code image or a bar code image. Further, in some alternate embodiments, as explained via FIG. 4, the security code representative of the security token may be attached to the package via a softkey stored in a smart-lock, the smart-lock securing the package.

At step 504, the receiver device 104 may capture the security code from the package at the time of delivery of the package to the receiver. In the embodiments as explained via FIG. 3, the receiver device 104 may capture the security code from the package via a camera, by scanning the security code-bearing image (i.e. the QR code image or the bar code image). In the embodiments as explained via FIG. 4, the receiver device 104 may capture the security code (i.e. a softkey stored in the smart-lock) from the package, by establishing a communication channel with the smart-lock securing on the package. For example, the communication channel may be a Bluetooth-based communication channel or a Near Field Communication (NFC)-based communication channel.

At step 506, the receiver device 104 may correlate the security code with the security token, to identify a match between the security code and the security token. At step 508, upon successful matching of the security code with the security token, access of the package may be allowed to the receiver.

In order to allow access, additionally, an identity of the receiver and at least one of: a location of the delivery associated with the receiver and a time of the delivery of the package to the receiver may be validated. For example, the validation may be performed using a SAS token, via a SAS metadata server. The location of the delivery associated with the receiver and the time of the delivery of the package to the receiver may be validated with respect to the receiver location and the delivery time-window associated with the security data, respectively.

Further, in order to allow access, a communication channel may be established between the smart-lock attached to the package and the receiver device 104. At the time of delivering the package to the receiver, the smart-lock may be configured in a closed condition to secure the package. Upon successful matching of the security code with the security token and validating of the identity of the recipient and at least one of the location of the delivery associated with the recipient and the time of the delivery of the package to the recipient, a digital handshake may be performed between the receiver device 104 and the smart-lock via the communication channel, to configure the smart-lock in an open condition, to thereby allow access to the package.

In some embodiments, the package may be additionally secured using the biometrics of the delivery person. In such embodiments, the security data may further include the biometrics data of the delivery person that may be fetched from a database upon assigning of the delivery person. As such, in order to allow access to the package, at the time of delivery of the package to the receiver, the biometrics of the delivery person may be obtained, for example, via the receiver device 104. The biometrics may be correlated with the biometrics data of the delivery person to identify a match therebetween. Upon successful matching of the biometrics with the biometrics data and the security code with the security token, access of the package may be allowed for the receiver.

Figure 6:
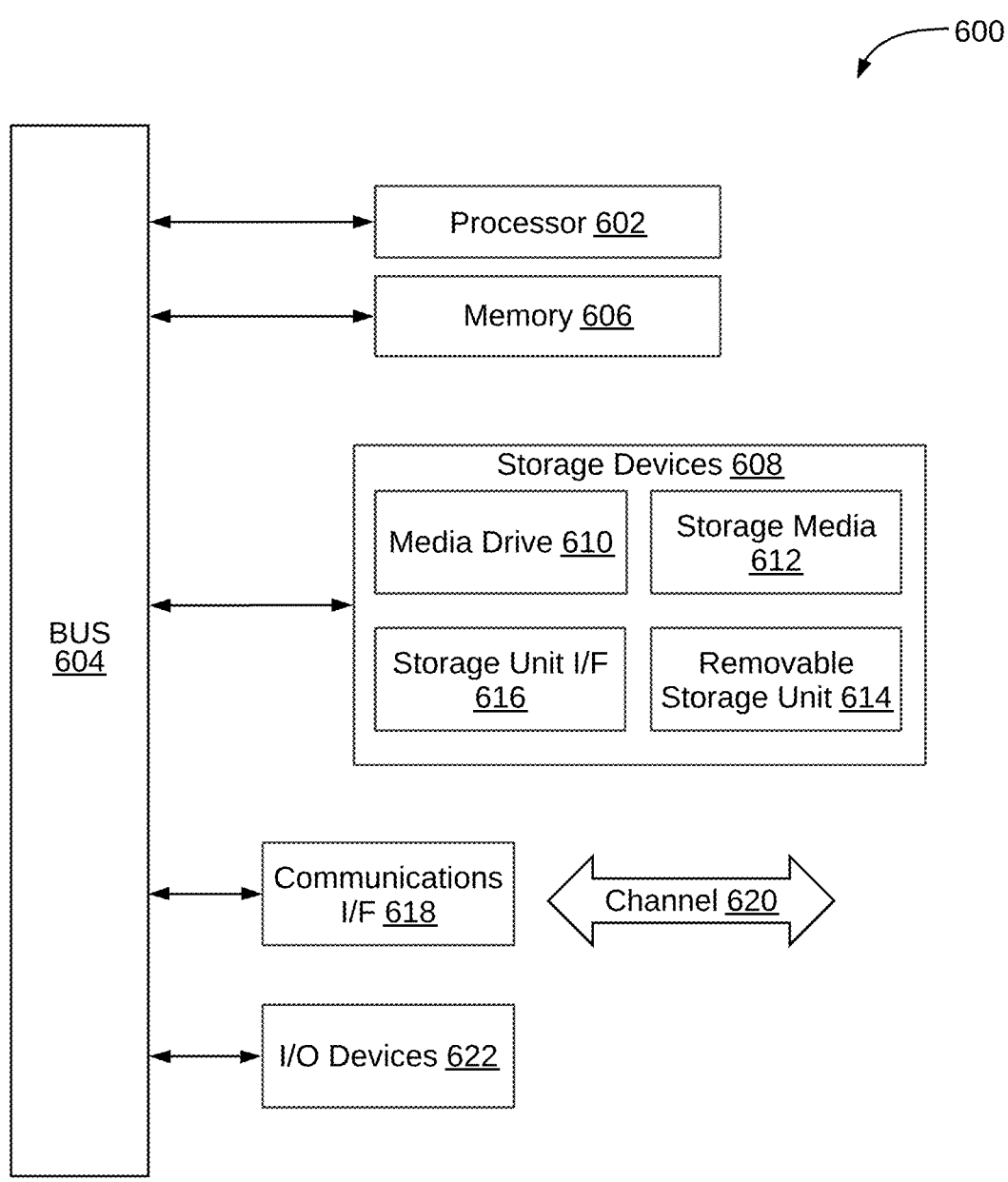
FIG. 6 is an exemplary computing system that may be employed to implement processing functionality for various embodiments.

Referring now to FIG. 6, an exemplary computing system 600 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 600 may represent, for example, a user device such as a desktop, a laptop, a mobile phone, personal entertainment device, DVR, and so on, or any other type of special or general-purpose computing device as may be desirable or appropriate for a given application or environment. The computing system 600 may include one or more processors, such as a processor 602 that may be implemented using a general or special purpose processing engine such as, for example, a microprocessor, microcontroller or other control logic. In this example, the processor 602 is connected to a bus 604 or other communication media. In some embodiments, the processor 602 may be an Artificial Intelligence (AI) processor, which may be implemented as a Tensor Processing Unit (TPU), or a graphical processor unit, or a custom programmable solution Field-Programmable Gate Array (FPGA).

The computing system 600 may also include a memory 606 (main memory), for example, Random Access Memory (RAM) or other dynamic memory, for storing information and instructions to be executed by the processor 602. The memory 606 also may be used for storing temporary variables or other intermediate information during the execution of instructions to be executed by processor 602. The computing system 600 may likewise include a read-only memory ("ROM") or other static storage device coupled to bus 604 for storing static information and instructions for the processor 602.

The computing system 600 may also include storage devices 608, which may include, for example, a media drive 610 and a removable storage interface. The media drive 610 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 612 may include, for example, a hard disk, magnetic tape, flash drive, or other fixed or removable media that is read by and written to by the media drive 610. As these examples illustrate, the storage media 612 may include a computer-readable storage medium having stored therein particular computer software or data.

In alternative embodiments, the storage devices 608 may include other similar instrumentalities for allowing computer programs or other instructions or data to be loaded into the computing system 600. Such instrumentalities may include, for example, a removable storage unit 614 and a storage unit interface 616, such as a program cartridge and cartridge interface, a removable memory (for example, a flash memory or other removable memory module) and memory slot, and other removable storage units and interfaces that allow software and data to be transferred from the removable storage unit 614 to the computing system 600.

The computing system 600 may also include a communications interface 618. The communications interface 618 may be used to allow software and data to be transferred between the computing system 600 and external devices. Examples of the communications interface 618 may include a network interface (such as an Ethernet or other NIC card), a communications port (such as for example, a USB port, a micro-USB port), Near field Communication (NFC), etc. Software and data transferred via the communications interface 618 are in the form of signals which may be electronic, electromagnetic, optical, or other signals capable of being received by the communications interface 618. These signals are provided to the communications interface 618 via a channel 620. The channel 620 may carry signals and may be implemented using a wireless medium, wire or cable, fiber optics, or other communications medium. Some examples of the channel 620 may include a phone line, a cellular phone link, an RF link, a Bluetooth link, a network interface, a local or wide area network, and other communications channels.

The computing system 600 may further include Input/Output (I/O) devices 622. Examples may include, but are not limited to a display, keypad, microphone, audio speakers, vibrating motor, LED lights, etc. The I/O devices 622 may receive input from a user and also display an output of the computation performed by the processor 602. In this document, the terms "computer program product" and "computer-readable medium" may be used generally to refer to media such as, for example, the memory 606, the storage devices 608, the removable storage unit 614, or signal(s) on the channel 620. These and other forms of computer-readable media may be involved in providing one or more sequences of one or more instructions to the processor 602 for execution. Such instructions, generally referred to as "computer program code" (which may be grouped in the form of computer programs or other groupings), when executed, enable the computing system 600 to perform features or functions of embodiments of the present invention.

In an embodiment where the elements are implemented using software, the software may be stored in a computer-readable medium and loaded into the computing system 600 using, for example, the removable storage unit 614, the media drive 610 or the communications interface 618. The control logic (in this example, software instructions or computer program code), when executed by the processor 602, causes the processor 602 to perform the functions of the invention as described herein.

One or more techniques for securing delivery of a package are disclosed in the above disclosure. The one or more techniques help the package and the product therein from getting tampered. The NFC or Bluetooth-based communication channel helps to process the softkey information accordingly. The above techniques require minimal configuration overhead on data and less Internet bandwidth. Further, the techniques implement smart-locks which mostly work in offline mode, thereby providing a robust solution. Further, by using the SXML based token, the above techniques ensure maximum security of the security token. The package can be further secured by adding biometric data of the delivery person. Moreover, any tampering can be reported by the receiver if the token is mismatching, or if the validity is over due to transit delay, or if the location is mismatching.

It is intended that the disclosure and examples be considered as exemplary only, with a true scope and spirit of disclosed embodiments being indicated by the following claims.

What is claimed is:

1. A method of securing delivery of a package, the method comprising:
   receiving, by a receiver device, from a token generating server, a security token corresponding to security data associated with the delivery of the package,
      wherein the token generating server is configured to generate the security token corresponding to the security data upon receiving the security data from a sender device;
      wherein a security code representative of the security token is attached to the package; and
      wherein the security data further comprises biometrics data of a delivery person, wherein the biometrics data of the delivery person is fetched from a database upon assigning of the delivery person;
   capturing, by the receiver device, the security code from the package at the time of delivery of the package to a receiver;
   correlating, by the receiver device, the security code with the security token, to identify a match between the security code and the security token;
   obtaining, by the receiver device, biometrics of the delivery person, at the time of receiving the package by the receiver;
   correlating, by the receiver device, the biometrics with the biometrics data of the delivery person to identify a match therebetween; and
   upon successful matching of the security code with the security token and the biometrics with the biometrics data of the delivery person, allowing access to the package to the receiver,
      wherein allowing access to the package comprises:
         establishing a communication channel between a smart-lock attached to the package and the receiver device,
            wherein the communication channel is based on one of: a Bluetooth-based communication and a Near Field Communication (NFC)-based communication, and
            wherein, at the time of delivering the package to the receiver, the smart-lock is configured in a closed condition to secure the package; and
         upon successful matching of the security code with the security token, the biometrics with the biometrics data of the delivery person, and validating of an identity of the receiver and at least one of: a location of delivery associated with the receiver and a time of the delivery of the package to the receiver, performing a digital handshake between the receiver device and the smart-lock via the communication channel, to configure the smart-lock in an open condition, to thereby allow access to the package; and
   upon mismatch between the security code and the security token or the biometrics with the biometrics data of the delivery person, generating a notification to be sent to the sender device.

2. The method of claim 1, wherein the security data comprises at least one of: a receiver location and a delivery time-window.

3. The method of claim 1, wherein the security token is a SXML-based token.

4. The method of claim 1, wherein the security code representative of the security token is attached to the package via one of:

a security code-bearing image disposed on an outer surface of the package; and
a softkey stored in a smart-lock, the smart-lock securing the package.

5. The method of claim 4, wherein the security code-bearing image comprises one of:
a QR code image and a bar code image.

6. The method of claim 2, wherein allowing access to the package comprises validating via a SAS token:
the identity of the receiver; and
at least one of: the location of the delivery associated with the receiver and the time of the delivery of the package to the receiver,
wherein at least one of the location of the delivery associated with the recipient receiver and the time of the delivery of the package to the receiver is validated with respect to least one of: the receiver location and the delivery time-window associated with the security data.

7. A system for securing delivery of a package, the system comprising:
a processor; and
a memory communicatively coupled to the processor, wherein the memory stores a plurality of instructions, which upon execution by the processor, cause the processor to:
receive, from a token generating server, a security token corresponding to security data associated with the delivery of the package, wherein the token generating server is configured to generate the security token corresponding to the security data upon receiving the security data from a sender device;
wherein a security code representative of the security token is attached to the package; and
wherein the security data further comprises biometrics data of a delivery person, wherein the biometrics data of the delivery person is fetched from a database upon assigning of the delivery person;
capture the security code from the package at the time of delivery of the package to a receiver;
correlate the security code with the security token, to identify a match between the security code and the security token;
obtain biometrics of the delivery person, at the time of receiving the package by the receiver;
correlate the biometrics with the biometrics data of the delivery person to identify a match therebetween; and
upon successful matching of the security code with the security token and the biometrics with the biometrics data of the delivery person, allow access of the package to the receiver,
wherein allowing access to the package comprises:
establishing a communication channel between a smart-lock attached to the package and a receiver device,
wherein the communication channel is based on one of: a Bluetooth-based communication and a Near Field Communication (NFC)-based communication, and
wherein, at the time of delivering the package to the receiver, the smart-lock is configured in a closed condition to secure the package; and
upon successful matching of the security code with the security token, the biometrics with the biometrics data of the delivery person, and validating of an identity of the receiver and at least one of: a location of delivery associated with the receiver and a time of the delivery of the package to the receiver, performing a digital handshake between the receiver device and the smart-lock via the communication channel, to configure the smart-lock in an open condition, to thereby allow access to the package; and
upon mismatch between the security code and the security token or the biometrics with the biometrics data of the delivery person, generating a notification to be sent to the sender device.

8. The system of claim 7, wherein the security code representative of the security token is attached to the package via one of:
a security code-bearing image disposed on an outer surface of the package, wherein the security code-bearing image comprises one of:
a QR code image, and
a bar code image; and
a softkey stored in a smart-lock, the smart-lock securing the package.

9. The system of claim 7,
wherein the security data comprises at least one of: a receiver location and a delivery time-window,
wherein the security token is a SXML-based token, and
wherein allowing access to the package comprises:
validating via a SAS token:
the identity of the receiver; and
at least one of: the location of the delivery associated with the receiver and the time of the delivery of the package to the receiver,
wherein at least one of the location of the delivery associated with the receiver and the time of the delivery of the package to the receiver is validated with respect to least one of: the receiver location and the delivery time-window associated with the security data.

10. A non-transitory computer-readable medium storing computer-executable instructions for securing delivery of a package, the computer-executable instructions configured for:
receiving from a token generating server, a security token corresponding to security data associated with the delivery of the package,
wherein the token generating server is configured to generate the security token corresponding to the security data upon receiving the security data from a sender device;
wherein a security code representative of the security token is attached to the package; and
wherein the security data further comprises biometrics data of a delivery person, wherein the biometrics data of the delivery person is fetched from a database upon assigning of the delivery person;
capturing the security code from the package at the time of delivery of the package to a receiver;
correlating the security code with the security token, to identify a match between the security code and the security token;
obtaining, by the receiver device, biometrics of the delivery person, at the time of receiving the package by the receiver;
correlating, by the receiver device, the biometrics with the biometrics data of the delivery person to identify a match therebetween; and upon successful matching of the security code with the security token and the biometrics with the biometrics data of the delivery person, allowing access to the package to the receiver,
wherein allowing access to the package comprises:
establishing a communication channel between a smart-lock attached to the package and a receiver device,
wherein the communication channel is based on one of: a Bluetooth-based communication and a Near Field Communication (NFC)-based communication,
wherein, at the time of delivering the package to the receiver, the smart-lock is configured in a closed condition to secure the package; and
upon successful matching of the security code with the security token, the biometrics with the biometrics data of the delivery person, and validating of an identity of the receiver and at least one of: a location of delivery associated with the receiver and a time of the delivery of the package to the receiver, performing a digital handshake between the receiver device and the smart-lock via the communication channel, to configure the smart-lock in an open condition, to thereby allow access to the package; and
upon mismatch between the security code and the security token or the biometrics with the biometrics data of the delivery person, generating a notification to be sent to the sender device.

11. The non-transitory computer-readable medium of claim 10, wherein the security code representative of the security token is attached to the package via one of:
a security code-bearing image disposed on an outer surface of the package, wherein the security code-bearing image comprises one of:
a QR code image, and
a bar code image; and
a softkey stored in a smart-lock, the smart-lock securing the package.

12. The non-transitory computer-readable medium of claim 10,
wherein the security data comprises at least one of: a receiver location and a delivery time-window,
wherein the security token is a SXML-based token, and
wherein allowing access to the package comprises:
validating via a SAS token:
the identity of the receiver; and
at least one of: the location of the delivery associated with the receiver and the time of the delivery of the package to the receiver,
wherein at least one of the location of the delivery associated with the receiver and the time of the delivery of the package to the recipient receiver is validated with respect to least one of: the receiver location and the delivery time-window associated with the security data.

* * * * *